（12）United States Patent
Hakola et al.

(10) Patent No.: US 11,838,946 B2
(45) Date of Patent: Dec. 5, 2023

(54) TRANSMISSION OPPORTUNITIES

(71) Applicant: Nokia Technologies Oy, Espoo (FI)

(72) Inventors: Sami Hakola, Kempele (FI); Esa Tiirola, Oulu (FI); Kari Hooli, Oulu (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 463 days.

(21) Appl. No.: 17/276,539

(22) PCT Filed: Sep. 28, 2018

(86) PCT No.: PCT/FI2018/050698
§ 371 (c)(1),
(2) Date: Mar. 16, 2021

(87) PCT Pub. No.: WO2020/065120
PCT Pub. Date: Apr. 2, 2020

(65) Prior Publication Data
US 2022/0039155 A1 Feb. 3, 2022

(51) Int. Cl.
*H04W 74/08* (2009.01)
*H04W 74/00* (2009.01)

(52) U.S. Cl.
CPC ..... *H04W 74/0808* (2013.01); *H04W 74/006* (2013.01)

(58) Field of Classification Search
None
See application file for complete search history.

(56) References Cited

U.S. PATENT DOCUMENTS

| 2018/0115994 | A1 | 4/2018 | Islam et al. |
| 2018/0242232 | A1 | 8/2018 | Chendamarai Kannan et al. |
| 2018/0242348 | A1 | 8/2018 | Chendamarai Kannan et al. |
| 2019/0069258 | A1* | 2/2019 | Jeon ...................... H04B 7/0695 |
| 2019/0261412 | A1* | 8/2019 | Novlan ................. H04W 16/14 |

FOREIGN PATENT DOCUMENTS

EP 3780745 A1 * 2/2021 .......... H04J 11/0069

* cited by examiner

*Primary Examiner* — Ajit Patel
(74) *Attorney, Agent, or Firm* — Harrington & Smith

(57) ABSTRACT

A method including configuring a first radio beam pair and at least a second radio beam pair to a communication connection, wherein the first radio beam pair includes a first transmission radio beam having a first transmission direction and the second radio beam pair including a second transmission radio beam having a second transmission direction different from the first transmission direction; triggering channel contention to transmit at least one message from the apparatus and performing radio channel sensing for both the first transmission radio beam and the second transmission radio beam during the channel contention; acquiring a transmission opportunity in response to detecting that a radio channel is available for at least one of the first transmission radio beam and the second transmission radio beam; and causing transmission of the at least one message during the transmission opportunity.

18 Claims, 6 Drawing Sheets

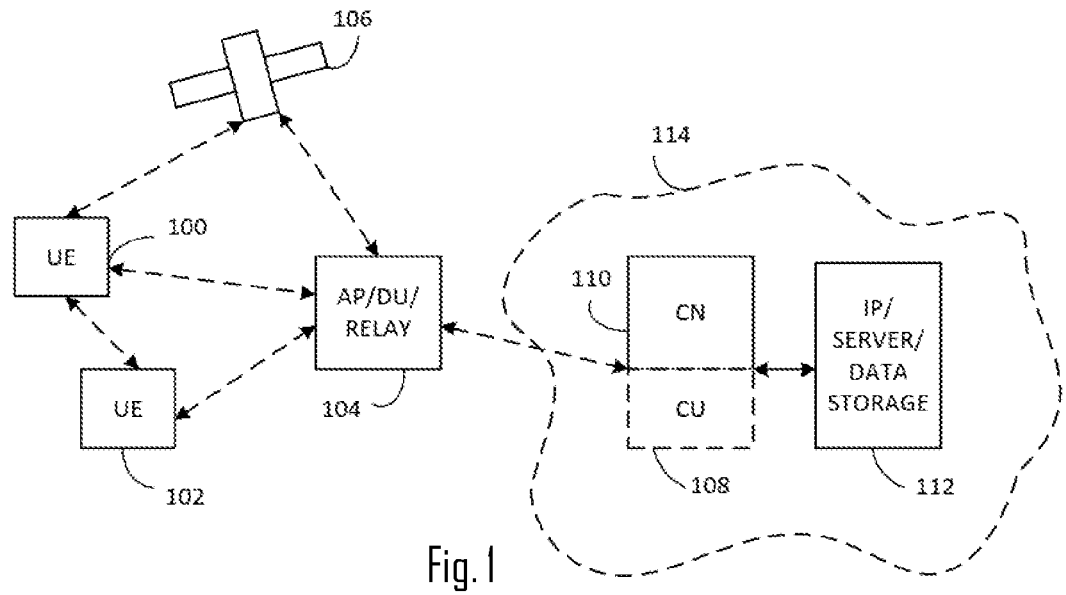
Fig. 1
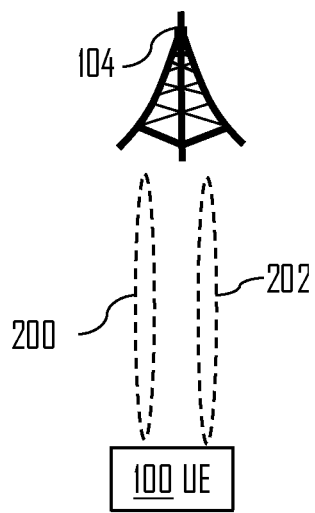
Fig. 2A
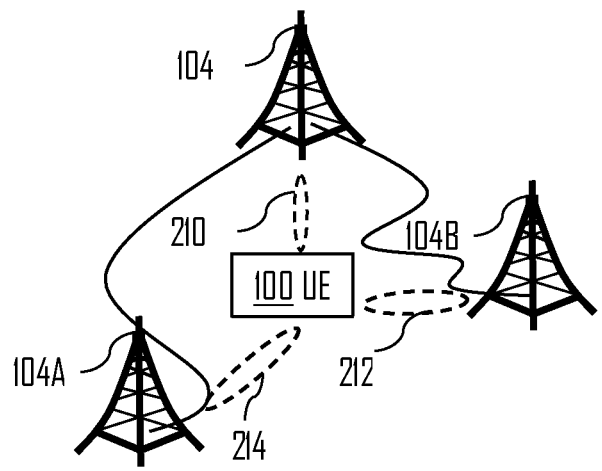
Fig. 2B
Fig. 2

TRANSMISSION OPPORTUNITIES

CROSS REFERENCE TO RELATED APPLICATION

This patent application is a U.S. National Stage application of International Patent Application Number PCT/FI2018/050698 filed Sep. 28, 2018, which is hereby incorporated by reference in its entirety.

TECHNICAL FIELD

The invention relates to communications in a system that employs channel sensing before acquiring a transmission opportunity.

BACKGROUND

Latest evolution versions of cellular communication systems support operation on millimeter wave frequencies, e.g. from 3 Gigahertz (GHz) to at least a decade higher frequencies. On such frequencies, the communication in a cell is may be realized by using directive beams between a terminal device (UE) and a base station (gNB), instead of omnidirectional beams. Such directive radio beams may be used to provide more precisely defined transmissions compared with conventional omnidirectional radio transmissions. It may be beneficial to provide solutions that enhance the use of radio beams in a communication network.

BRIEF DESCRIPTION

According to an aspect, there is provided the subject matter of the independent claims. Some embodiments are defined in the dependent claims.

According to an aspect, there is provided an apparatus comprising means for performing: configuring a first radio beam pair and at least a second radio beam pair to a communication connection, wherein the first radio beam pair comprises a first transmission radio beam having a first transmission direction and the second radio beam pair comprises a second transmission radio beam having a second transmission direction different from the first transmission direction; triggering channel contention to transmit at least one message and for performing radio channel sensing for both the first transmission radio beam and the second transmission radio beam during the channel contention; acquiring a transmission opportunity for the apparatus in response to the means for performing the radio channel sensing detecting that a radio channel is available for at least one of the first transmission radio beam and the second transmission radio beam; and causing transmission of the at least one message during the transmission opportunity by using the at least one of the first transmission radio beam and the second transmission radio beam.

In an embodiment, the means are further configured to perform the channel sensing simultaneously for the first transmission radio beam and the second transmission radio beam.

In an embodiment, the means are further configured to perform the channel sensing by switching between the first transmission radio beam and the second transmission radio beam.

In an embodiment, the means are configured to perform the switching between the first transmission radio beam and the second transmission radio beam according to a timing pattern determined before the channel contention is triggered.

In an embodiment, the means are further configured to perform: enabling simultaneous transmission of the first transmission radio beam and the second transmission radio beam; acquiring the transmission opportunity for the first transmission radio beam and, upon acquiring the transmission opportunity for the first transmission radio beam, continuing the channel contention for the at least second transmission radio beam while performing transmission of the at least one message with the first transmission radio beam; upon acquiring a transmission opportunity for the second transmission radio beam, transmitting the at least one message with first transmission radio beam and the second transmission radio beam.

In an embodiment, the means are further configured to end the transmission opportunity of both the first transmission radio beam and the second transmission radio beam when a time limit for ending the transmission opportunity of the first transmission radio beam is reached.

In an embodiment, the means are further configured to perform: enabling transmission by exclusively one transmission radio beam at a time; acquiring the transmission opportunity for the first transmission radio beam and, upon acquiring the transmission opportunity for the first transmission radio beam, disabling the channel contention of the at least second transmission radio beam while performing transmission of the at least one message with the first transmission radio beam.

In an embodiment, the means are further configured to select, as a transmission radio beam transmitting first, a transmission radio beam that is detected in the channel sensing to be available first.

In an embodiment, the transmission opportunity starts when the apparatus starts the transmission of the at least one message and ends at a determined time instant.

In an embodiment, the apparatus is for a terminal device of a cellular communication system, wherein the first transmission radio beam and the second transmission radio beam are uplink transmission radio beams, and wherein the means are further configured to receive the determined time instant from an access node before the transmission opportunity starts.

In an embodiment, the means are further configured to receive a configuration of the beam pairs from the access node before the transmission opportunity starts.

In an embodiment, the apparatus is for an access node of a cellular communication system, wherein the first transmission radio beam and the second transmission radio beam are downlink transmission radio beams, and wherein the means are further configured to determine the time instant from a start time of the transmission opportunity.

In an embodiment, the means comprises: at least one processor; and at least one memory including computer program code, the at least one memory and computer program code configured to, with the at least one processor, cause the performance of the apparatus.

According to another aspect, there is provided an apparatus comprising means for performing: configuring a first radio beam pair and at least a second radio beam pair to a communication connection, wherein the first radio beam pair comprises a first reception radio beam having a first reception direction associated with a first transmission radio beam of a transmitter apparatus of the communication connection, and wherein the second radio beam pair comprises a second reception radio beam having a second reception direction, different from the first reception direction, and associated with a second transmission radio beam of the transmitter apparatus of the communication connection; scanning for a message of the communication connection from both the first reception radio beam and the second reception radio beam, wherein the scanning from the first reception radio beam and the second reception radio beam is synchronized with transmission timings of the first transmission radio beam and second transmission radio beam; and upon detecting a message of the communication connection in at least one of the first reception radio beam and the second reception radio beam, decoding the message.

In an embodiment, the means are further configured to perform the scanning simultaneously from the first reception radio beam and the second reception radio beam.

In an embodiment, the means are further configured to perform the scanning by switching between the first reception radio beam and the second reception radio beam.

In an embodiment, the means are further configured to: determine time allocations of the first reception beam, perform the scanning from the first reception radio beam during the time allocations of the first reception beam, and not perform the scanning from the first reception radio beam between the time allocations of the first reception radio beam; and determine time allocations of the second reception radio beam, perform the scanning from the second reception radio beam during the time allocations of the second reception radio beam, and not perform the scanning from the second reception radio beam between the time allocations of the second reception radio beam.

In an embodiment, the means are further configured to disable scanning from the second reception radio beam upon detecting a message of the communication connection in the first reception beam.

In an embodiment, the means comprises: at least one processor; and at least one memory including computer program code, the at least one memory and computer program code configured to, with the at least one processor, cause the performance of the apparatus.

According to another aspect, there is provided a method comprising: configuring, by an apparatus, a first radio beam pair and at least a second radio beam pair to a communication connection, wherein the first radio beam pair comprises a first transmission radio beam having a first transmission direction and the second radio beam pair comprises a second transmission radio beam having a second transmission direction different from the first transmission direction; triggering, by the apparatus, channel contention to transmit at least one message from the apparatus and performing radio channel sensing for both the first transmission radio beam and the second transmission radio beam during the channel contention; acquiring, by the apparatus, a transmission opportunity for the apparatus in response to detecting that a radio channel is available for at least one of the first transmission radio beam and the second transmission radio beam; and causing, by the apparatus, transmission of the at least one message during the transmission opportunity by using the at least one of the first transmission radio beam and the second transmission radio beam.

In an embodiment, the channel sensing is performed simultaneously for the first transmission radio beam and the second transmission radio beam.

In an embodiment, the channel sensing is performed by switching between the first transmission radio beam and the second transmission radio beam.

In an embodiment, the switching between the first transmission radio beam and the second transmission radio beam is performed according to a timing pattern determined before the channel contention is triggered.

In an embodiment, the method further comprises by the apparatus: enabling simultaneous transmission of the first transmission radio beam and the second transmission radio beam; acquiring the transmission opportunity for the first transmission radio beam and, upon acquiring the transmission opportunity for the first transmission radio beam, continuing the channel contention for the at least second transmission radio beam while performing transmission of the at least one message with the first transmission radio beam; upon acquiring a transmission opportunity for the second transmission radio beam, transmitting the at least one message with first transmission radio beam and the second transmission radio beam.

In an embodiment, the method further comprises ending the transmission opportunity of both the first transmission radio beam and the second transmission radio beam when a time limit for ending the transmission opportunity of the first transmission radio beam is reached.

In an embodiment, the method further comprises: enabling transmission by exclusively one transmission radio beam at a time; acquiring the transmission opportunity for the first transmission radio beam and, upon acquiring the transmission opportunity for the first transmission radio beam, disabling the channel contention of the at least second transmission radio beam while performing transmission of the at least one message with the first transmission radio beam.

In an embodiment, the method further comprises selecting, as a transmission radio beam transmitting first, a transmission radio beam that is detected in the channel sensing to be available first.

In an embodiment, the transmission opportunity starts when the apparatus starts the transmission of the at least one message and ends at a determined time instant.

In an embodiment, the method is performed in a terminal device of a cellular communication system, wherein the first transmission radio beam and the second transmission radio beam are uplink transmission radio beams, and the method further comprises receiving the determined time instant from an access node before the transmission opportunity starts.

In an embodiment, the method further comprises receiving a configuration of the radio beam pairs from the access node before the transmission opportunity starts.

In an embodiment, the method is performed in an access node of a cellular communication system, wherein the first transmission radio beam and the second transmission radio beam are downlink transmission radio beams, and the method further comprises determining the time instant from a start time of the transmission opportunity.

According to another aspect, there is provided a method comprising: configuring, by an apparatus, a first radio beam pair and at least a second radio beam pair to a communication connection, wherein the first radio beam pair comprises a first reception radio beam having a first reception direction associated with a first transmission radio beam of a transmitter apparatus of the communication connection, and wherein the second radio beam pair comprises a second reception radio beam having a second reception direction, different from the first reception direction, and associated with a second transmission radio beam of the transmitter apparatus of the communication connection; scanning, by the apparatus, for a message of the communication connection from both the first reception radio beam and the second reception radio beam, wherein the scanning from the first reception radio beam and the second reception radio beam is synchronized with transmission timings of the first transmission radio beam and second transmission radio beam; and upon detecting a message of the communication connection in at least one of the first reception radio beam and the second reception radio beam, decoding the message.

In an embodiment, the scanning is performed simultaneously from the first reception radio beam and the second reception radio beam.

In an embodiment, the scanning is performed by switching between the first reception radio beam and the second reception radio beam.

In an embodiment, the method further comprises: determining time allocations of the first reception beam, performing the scanning from the first reception radio beam during the time allocations of the first reception beam, and not performing the scanning from the first reception radio beam between the time allocations of the first reception radio beam; and determining time allocations of the second reception radio beam, performing the scanning from the second reception radio beam during the time allocations of the second reception radio beam, and not performing the scanning from the second reception radio beam between the time allocations of the second reception radio beam.

In an embodiment, the method further comprises disabling the scanning from the second reception radio beam upon detecting a message of the communication connection in the first reception beam.

According to another aspect, there is provided a computer program product embodied on a computer-readable medium and comprising a computer program code readable by a computer, wherein the computer program code configures the computer to carry out a computer process comprising: configuring a first radio beam pair and at least a second radio beam pair to a communication connection, wherein the first radio beam pair comprises a first transmission radio beam having a first transmission direction and the second radio beam pair comprises a second transmission radio beam having a second transmission direction different from the first transmission direction; triggering channel contention to transmit at least one message from the apparatus and performing radio channel sensing for both the first transmission radio beam and the second transmission radio beam during the channel contention; acquiring a transmission opportunity for the apparatus in response to detecting that a radio channel is available for at least one of the first transmission radio beam and the second transmission radio beam; and causing transmission of the at least one message during the transmission opportunity by using the at least one of the first transmission radio beam and the second transmission radio beam.

According to another aspect, there is provided a computer program product embodied on a computer-readable medium and comprising a computer program code readable by a computer, wherein the computer program code configures the computer to carry out a computer process comprising: configuring a first radio beam pair and at least a second radio beam pair to a communication connection, wherein the first radio beam pair comprises a first reception radio beam having a first reception direction associated with a first transmission radio beam of a transmitter apparatus of the communication connection, and wherein the second radio beam pair comprises a second reception radio beam having a second reception direction, different from the first reception direction, and associated with a second transmission radio beam of the transmitter apparatus of the communication connection; scanning for a message of the communication connection from both the first reception radio beam and the second reception radio beam, wherein the scanning from the first reception radio beam and the second reception radio beam is synchronized with transmission timings of the first transmission radio beam and second transmission radio beam; and upon detecting a message of the communication connection in at least one of the first reception radio beam and the second reception radio beam, decoding the message.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which FIG. 1 illustrates an example of a wireless network to which embodiments of the invention may be applied;

FIGS. 2A and 2B illustrate some embodiments for forming radio beam pairings for a terminal device;

DETAILED DESCRIPTION OF SOME EMBODIMENTS

Figure 3:
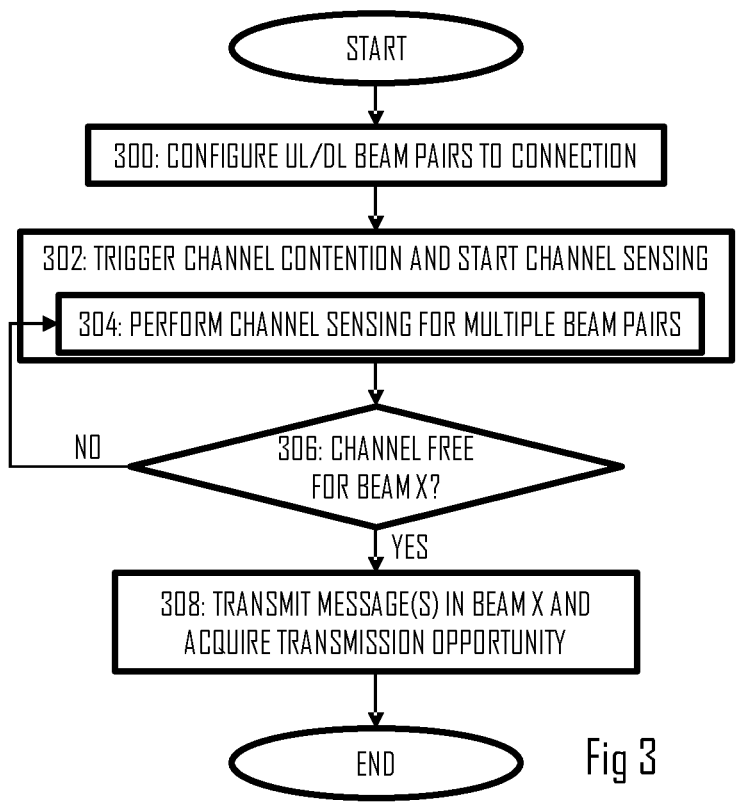
FIGS. 3 and 4 illustrate some embodiments for improving transmission opportunity acquisition for a transmitter apparatus.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth (e.g. Bluetooth Low Energy), personal communications services (PCS), ZigBee, wideband code division multiple access (WCDMA), systems using ultrawideband (UWB) technology, sensor networks, mobile ad-hoc networks (MANETs) and Internet Protocol multimedia subsystems (IMS) or any combination thereof.

FIG. 1 depicts an example of a simplified system architecture only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties.

The example of FIG. 1 shows a part of a radio access network. Referring to FIG. 1, user devices 100 and 102 may be configured to be in a wireless connection on one or more communication channels in a cell with an access node, such as (e/g)NodeB, 104 providing the cell. A physical link from a user device to the access node 104 is called an uplink or a reverse link and a physical link from the access node 104 to the user device is called a downlink or a forward link. It should be appreciated that access node 104 or nodes or their functionalities may be implemented by using any node, host, server or access point etc. entity suitable for such a usage. The term (e/g)NodeB used above may refer to eNodeB (i.e. eNB) and/or gNodeB (i.e. gNB), for example.

A communication system typically comprises more than one access node (e.g. similar to the access node 104) in which case the access nodes may also be configured to communicate with one another over links, wired or wireless, designed for the purpose. These links may be used for signaling purposes. The access node may be a computing device configured to control the radio resources of communication system it is coupled to. Access node, such as the access node 104, may also be called a base station, an access point, an access node, a network node, network element or any other type of interfacing device including a relay station capable of operating in a wireless environment. The access node includes or is coupled to transceivers. From the transceivers of the access node, a connection is provided to one or more antenna units that establish bi-directional radio links to user devices. The antenna unit may comprise a plurality of antennas or antenna elements. The access node 104 is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device, such as user devices 100 and 102 (also called UE, user equipment, user terminal, terminal device, etc.) illustrates one type of an apparatus to which resources on the air interface are allocated and assigned. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, Machine Type Communication (MTC) device, and/or vehicular user device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

The number of reception and/or transmission antennas of the UE 100 and/or UE 102 may vary according to a current implementation. For example, each UE 100, 102 may comprise one or more antenna arrays for enabling beamforming for transmission and reception, as will be later disclosed in more detail. In a similar manner, the access node 104 may comprise an antenna array to provide the beamforming capability for both transmission and reception.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to support difference scenarios in terms of carrier frequency, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support inter-RAT operability (such as LTE-5G). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner in a centralized unit, CU 108. The CU may be comprised in the core network or in the cloud 114 but, in some embodiments, the CU is comprised in one or more of the access nodes 104.

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of access nodes, such as (e/gNodeBs), the user device may have an access to a plurality of radio cells and the system may comprise also other apparatuses, such as physical layer relay nodes or other network elements, etc. At least one of the access nodes may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The access nodes of FIG. 1 may provide any kind of these cells. A cellular radio system may be implemented as a multilayer network including several kinds of cells. Typically, in multilayer networks, one access node provides one kind of a cell or cells, and thus a plurality of access nodes are required to provide such a network structure.

As described above, both the UE and the gNB may be provided with an antenna array enabling beamforming in both transmission and reception. This enables focusing the radio energy precisely to a desired direction. It also enables establishment of spatial channels between the UE and gNB in terms of radio beams. Each spatial channel may be denoted by a radio beam pair comprising a transmission radio beam and a reception radio beam. The transmission radio beam is associated to a determined transmission direction at a transmitter (UE or gNB), and the reception radio beam is associated to a determined reception direction at a receiver (gNB or UE). As known, the spatial radio paths between the transmitter and the receiver may be formed through various radio propagation paths, and the transmitter may reach the receiver by focusing the radio energy into multiple, different transmission directions. This enable spatial diversity and spatial multiplexing of transmissions. When the spatial paths are identified, the radio beam pairs may be formed and associated with the transmission and reception directions. FIG. 2A illustrates a scenario where the radio beam pairs 200, 202 are established between the UE 100 and the access node 104 where an antenna array of the access node is located at a single location. The reader is advised that the radio beam pairs 200, 202 are illustrated as aligned because of simplicity. In real scenarios, the propagation paths of the radio beam pairs may be more complex.

Regarding the definition of the radio beam pair, the radio beam pair may be understood to comprise a transmission radio beam and a reception radio beam. The transmission radio beam of the beam pair may be represented by a beam that is emitted or radiated from an antenna of the transmitter to a desired transmission direction. In the radio channel, the radio beam is modified by the radio channel (absorption, diffraction, reflection, dispersion, etc.), and the radio beam arrives at an antenna array of the receiver as the reception radio beam of the beam pair. When a connection between the UE and the gNB comprises uplink and downlink, the connection comprises at least two radio beam pairs, at least one for the uplink and at least one for the downlink.

FIG. 2B illustrates a scenario where the antenna array of the gNB is distributed spatially amongst multiple antenna sites 104, 104A, 104B. The elements 104A and 104B may be called remote radio heads or transmit/receive points of the same gNB 104, thus all the antenna sites 104, 104A, and 104B forming the same cell where the UE 100 resides. Embodiments of the invention may be applied to both scenarios of FIGS. 2A and 2B.

Regarding establishment and management of the radio beam pairs, let us describe some functionalities. Beam indication may be used to assist the UE to set its transmission radio beam(s) and reception radio beam(s) properly for the reception of downlink and transmission of uplink, respectively. The beam indication may be based on measurements over the various radio beams supported by the UE and the gNB. Beam measurements and reporting employs procedures for providing the gNB with knowledge about available radio beams for the UE. A downlink reference signal may be used to measure the radio beams transmitted by the gNB, and the UE may measure the radio beams and provide the gNB with a downlink measurement report. If the channel is reciprocal in uplink and downlink, the radio beams for both uplink and downlink may be selected based on the downlink measurements. In this case, a reception radio beam configuration of the UE may serve also as a transmission beam configuration of the UE. In another embodiment, the UE is configured to transmit an uplink reference signal to the transmission radio beams of the UE in order to enable the gNB to separately measure and select uplink radio beams. The measurements may also be used to track and adjust the transmission and reception radio beams and, in some cases, to change the radio beam pairings.

Beam measurements and reporting as well as beam tracking and refinement functionalities are for providing means for the gNB to determine and control radio beam indication for downlink and uplink signals and channels. Beam indication in essence is a process where the gNB indicates the UE which is the transmission radio beam at the gNB and how to configure the UE's reception radio beam for downlink transmissions and, further, how the UE should set its transmission radio beam for the uplink transmissions.

UE can be configured, by using radio resource control (RRC) signaling, with for instance up to 64 TCI (Transmission Configuration Indication) states for a control resource set (CORESET). Each state may have one reference signal to characterize the transmission radio beam and, correspondingly, the reception radio beam at UE. CORESET defines time and frequency resources from where the UE searches for physical downlink control channel (PDCCH) candidates. The gNB may activate the TCI states by transmitting a medium access control (MAC) control element (CE) activation command. UE may be configured with multiple CORESETs. CORESET 0 may be used for scheduling both broadcast and unicast traffic to the UE. Separate spatial domain parameter configuration and activation signaling are provided for each CORESET.

Regarding a physical downlink shared channel (PDSCH), a MAC CE activation command may be used to select up to eight TCI states that can be dynamically indicated by downlink control information (DCI) when scheduling the PDSCH to the UE. Accordingly, multiple radio beam pairs may be scheduled to the UE for the transfer of downlink data.

Regarding uplink, the gNB may be configure the UE via RRC signaling with for instance up to 8 reference signals for each physical uplink control channel (PUCCH) resource. A reference signal can be denoted by using a determined indexing system. In case of more than one configured reference signals for the PUCCH resource, a MAC CE activation command may be used to select one of the reference signals to be applied at a time. The UE determines the transmission radio beam for the PUCCH resource based on activated reference signal.

On unlicensed and shared spectra, various wireless networks may operate on the same frequency band. In order to enable coexistence of the wireless networks, channel contention in the form of a listen-before-talk (LBT) procedure may be employed. In the LBT, a device having a message to transmit first performs channel sensing where the device scans whether or not there is another transmission on the channel. If the channel is sensed to be busy, i.e. another transmission is detected on the channel, the device may refrain from performing the transmission until the channel is free. If the device detects not transmission on the channel, the device may acquire a transmission opportunity to carry out transmission of the message. The LBT may equally be called clear channel assessment or carrier-sensing multiple access (CSMA).

Considering the beamforming in the context of the LBT, the device may have configured a determined transmission radio beam for the transmission and perform the channel sensing for the transmission radio beam. The device may thus sense the channel only from the transmission direction of the transmission radio beam. Another transmission direction of the device may have another result for the LBT but this may disregarded by the apparatus because it is not the transmission direction currently configured. In another embodiment, the device may perform a widebeam LBT where the device performs the channel sensing by using omnidirectional antenna configuration, e.g. without directive beamforming. Upon detecting the channel to be free, the device may carry out the transmission to the configured transmission radio beam.

Regarding the transmission opportunity (TXOP), a starting point of the TXOP may be the start of the transmission of the message. The duration of the TXOP may vary depending on the configuration and embodiment. Some literature use term "channel occupation time (COT)" for a similar purpose of defining a time interval when the device occupies the channel.

Figure 4:
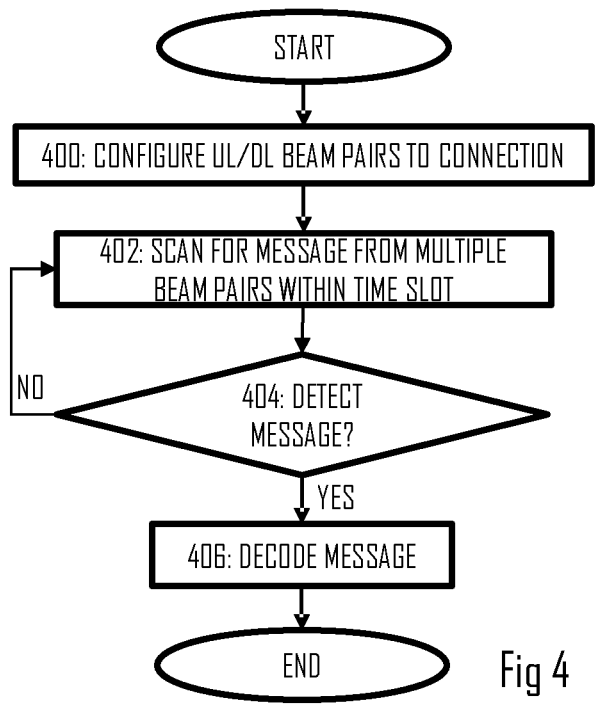

The LBT procedure may bring uncertainty to the transmissions, in particular to scheduled transmissions. When the transmission is scheduled to a transmitter, it is uncertain whether or not the transmitter is able to acquire the TXOP in the channel contention within the scheduled time. This may also bring problems from a scheduler point of view, e.g. with respect to handling fair sharing of resources amongst multiple user devices. FIGS. 3 and 4 illustrate some embodiments for reducing the uncertainty. FIGS. 3 and 4 illustrate embodiments of processes for reducing the uncertainty from the perspective of a transmitter (FIG. 3) and a receiver (FIG. 4). The transmitter may be the terminal device 100 or the access node 104, and the receiver may be the terminal device 100 or the access node 104, depending on the embodiment. In some embodiments, the procedure is similar in both uplink and downlink, while in other embodiments the downlink differs from the uplink.

Referring to FIG. 3, the process comprises as performed by an apparatus suitable for the transmitter: configuring (block 300) a first radio beam pair and at least a second radio beam pair to a communication connection, wherein the first radio beam pair comprises a first transmission radio beam having a first transmission direction and the second radio beam pair comprises a second transmission radio beam having a second transmission direction different from the first transmission direction; triggering (block 302) channel contention to transmit at least one message and for performing radio channel sensing (block 304) for both the first transmission radio beam and the second transmission radio beam during the channel contention; acquiring (block 308) a transmission opportunity for the apparatus in response to the means for performing the radio channel sensing detecting (YES in block 306) that a radio channel is available for at least one of the first transmission radio beam and the second transmission radio beam; and causing transmission (block 308) of the at least one message during the transmission opportunity by using the at least one of the first transmission radio beam and the second transmission radio beam.

Referring to FIG. 4, the process comprises as performed by an apparatus suitable for the receiver: configuring (block 400) a first radio beam pair and at least a second radio beam pair to a communication connection, wherein the first radio beam pair comprises a first reception radio beam having a first reception direction associated with a first transmission radio beam of a transmitter apparatus of the communication connection, and wherein the second radio beam pair comprises a second reception radio beam having a second reception direction, different from the first reception direction, and associated with a second transmission radio beam of the transmitter apparatus of the communication connection; scanning (block 402) for a message of the communication connection from both the first reception radio beam and the second reception radio beam, wherein the scanning from the first reception radio beam and the second reception radio beam is synchronized with transmission timings of the first transmission radio beam and second transmission radio beam; and upon detecting a message of the communication connection in at least one of the first reception radio beam and the second reception radio beam (YES in block 404), decoding the message (block 406).

In the embodiment of FIG. 3, the transmitter is provided with multiple separate opportunities for acquiring the TXOP, one for each radio beam pair. When performing the channel contention for transmitting the message, the transmitter may perform the channel sensing for each radio beam pair separately, thus increasing the probabilities for acquiring the TXOP. In a similar manner, the receiver may in FIG. 4 scan for the message from each reception radio beam of the radio beam pairs configured in blocks 300 and 400, thus enabling the multiple separate opportunities for acquiring the TXOP for the transmitter.

In an embodiment, block 304 is performed within a time slot having a determined time interval. The length of the time slot may be defined in terms of a number of symbols in the time slots, each symbol having a determined symbol duration. For example, in the 5G systems the number of orthogonal frequency division multiplexing (OFDM) symbols per time slot is 14. In another embodiment, block 304 spans over a plurality of consecutive time slots, e.g. two, three, or more.

Regarding the definition of the TXOP from the perspective of FIG. 3, the TXOP may be determined per radio beam pair or per transmitter, depending on the embodiment. Upon detecting that the channel is free for the first transmission radio beam, the transmitter acquires the TXOP for the first transmission radio beam when transmitting the first message after the detection. In some embodiments, the transmitter may acquire a separate TXOP for the second transmission radio beam, third transmission radio beam, etc. The channel contention for each radio beam may be triggered in the same instant in block 302, e.g. upon scheduling a transmission resource for the transmission of the at least one message. Accordingly, the transmitter may start searching for the TXOP separately for each of a plurality of radio beam pairs in block 304.

Figure 5:
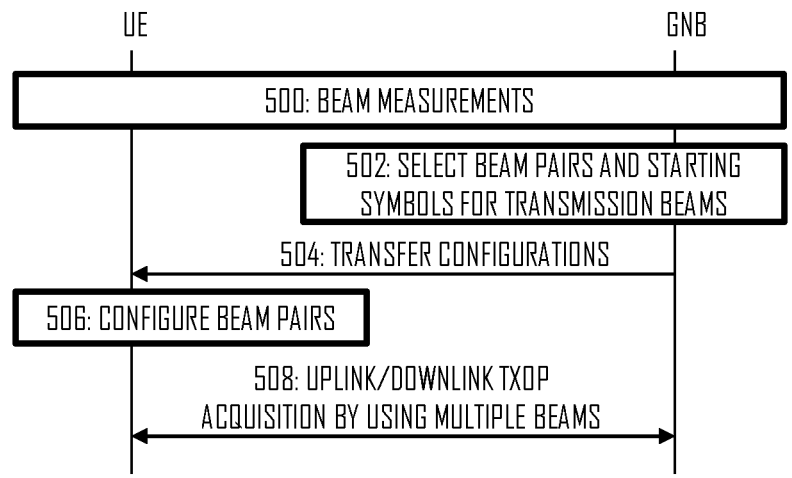
FIG. 5 illustrates a signaling diagram according to an embodiment.

FIG. 5 illustrates a signaling diagram that combines the embodiments of FIGS. 3 and 4. Referring to FIG. 5, the UE and the gNB may perform radio beam measurements in block 500. The measurements may be performed for downlink and, optionally, for uplink transmissions, and a signal quality of radio beams may be determined on the basis of the measurements. The UE may report the measurement results to the gNB in block 500. Upon performing the measurements, the gNB may select radio beam pairs in block 502, and also configure a time pattern defining starting times of the channel contention for each radio beam pair. The gNB may schedule the channel contention for the transmission of the message to start at different times for different radio beam pairs, thus bringing time diversity to the channel contention. For example, the channel contention for the first transmission radio beam may start immediately upon triggering the channel contention, the channel contention for the second transmission radio beam may start after expiry of a non-zero delay from the start of the channel contention for the first transmission radio beam, and the channel contention for a further transmission radio beam may start after expiry of another non-zero delay from the same time reference.

In an embodiment, the starting times are defined with respect to each other within a time slot or with respect to the symbols in the time slot. For example, each beam may have dedicated one or more time intervals within a time slot where to perform the channel contention and attempt the TXOP. The time intervals may be considered as monitoring occasions. The monitoring occasions of the different radio beams may have different timings that may or may not overlap amongst the radio beam pairs. Each radio beam pair may have at least one monitoring occasion and at least one non-monitoring occasion within the time slot where the transmitter performs the channel contention.

In an embodiment, the gNB may employ a link quality measure when scheduling the channel contention starting times to the radio beam pairs. The gNB and/or the UE may perform link quality measurements and acquire a link quality metric for each radio beam pair. The gNB may then schedule the first monitoring occasion to a radio beam pair associated with a link quality metric indicating the best link quality amongst the radio beam pairs. In other words, the radio beam pair providing the best link quality is provided with the best opportunity for the TXOP acquisition. The following monitoring occasions may be scheduled to the other radio beam pair(s) in a decreasing order of link quality. The link quality metric may be a signal-to-noise ratio (SNR), signal-to-interference-plus-noise ratio (SINR) or another metric measured from the link. In another embodiment, the link quality metric may be determined in respect to the successful channel contentions of the radio beam pairs. A radio beam pair or a transmission beam associated with the highest success ratio in the channel contention may be provided with the first monitoring occasion, a radio beam pair or a transmission beam associated with the second highest success ratio in the channel contention may be provided with the second monitoring occasion, and so on.

Upon completing block 502, the gNB may transmit the beam pair configurations and the starting time configurations for the beam pairs to the UE in step 504. Upon receiving the configurations in step 504, the UE may configure its communication circuitry for the radio beam pairs, i.e. configure transmission radio beams and reception radio beams according to the configuration received in step 504. In step 508, uplink/downlink transmissions may be performed according to the principles described in the embodiments above and below.

Figure 6:
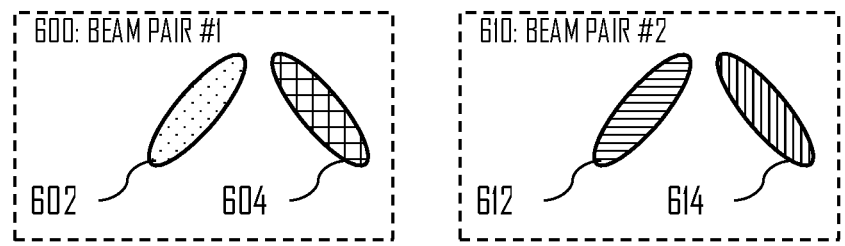
FIGS. 6 to 8 illustrate some embodiments for channel contention and associated transmission using radio beam pairs.
Figure 6:
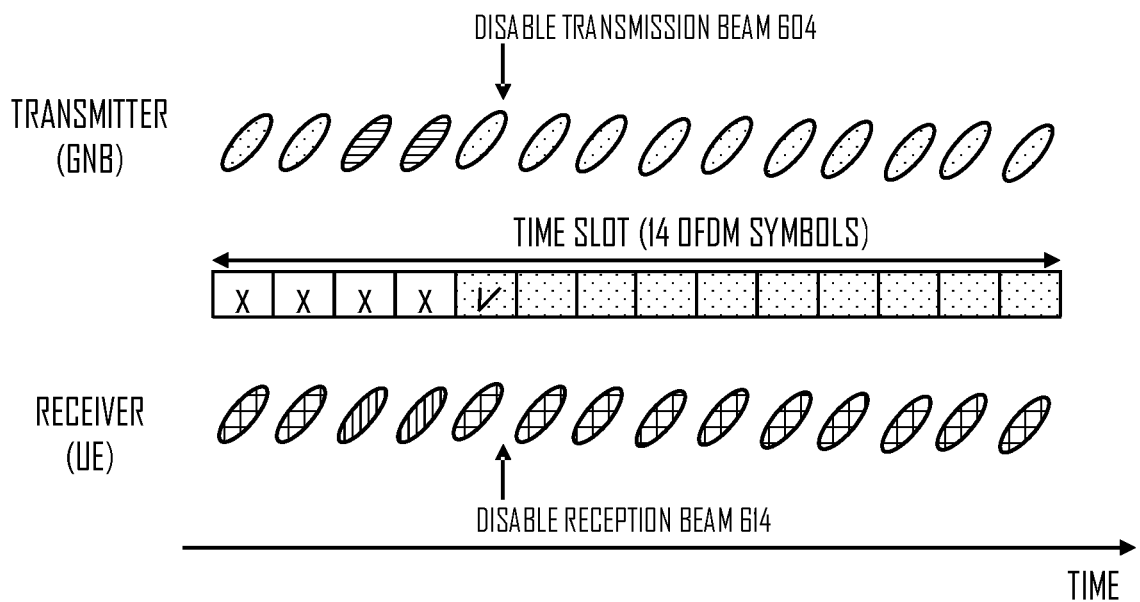
Figure 7:
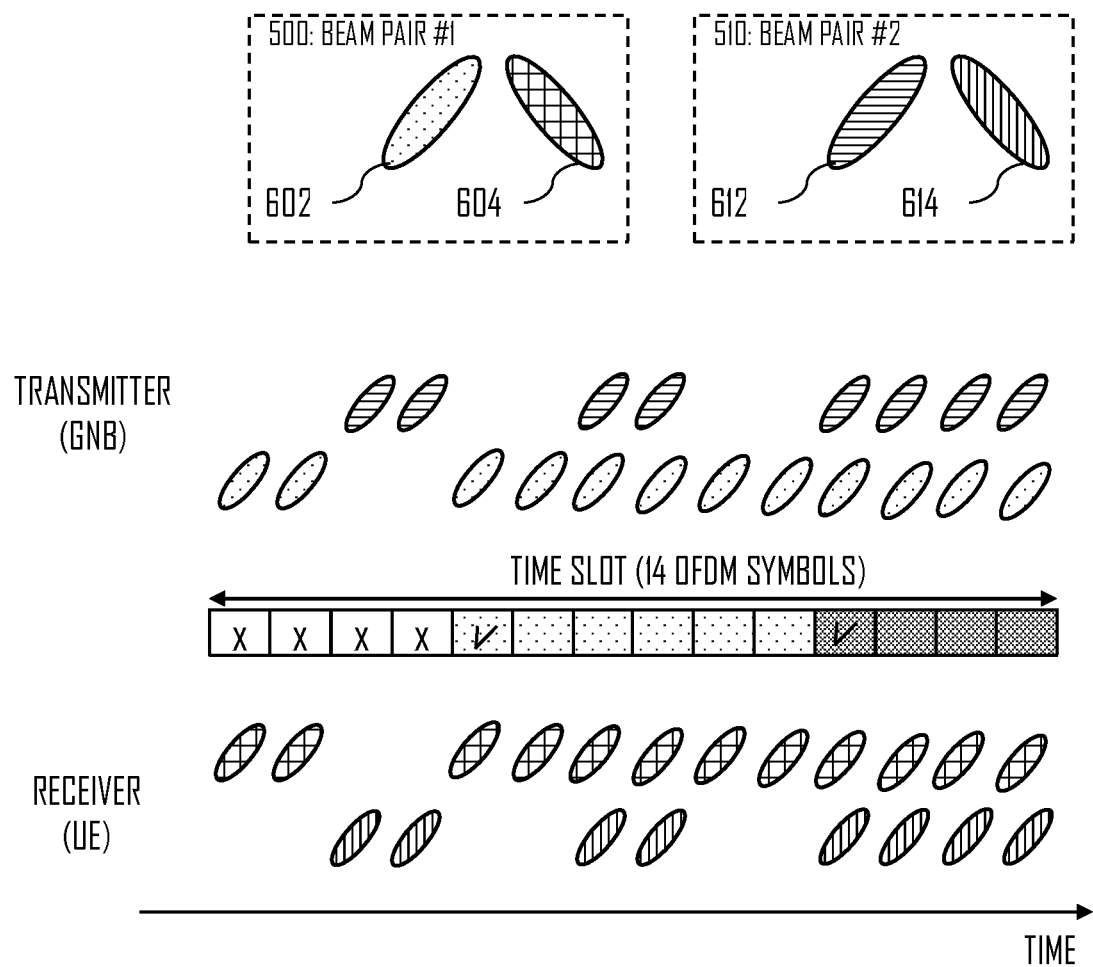
Figure 8:
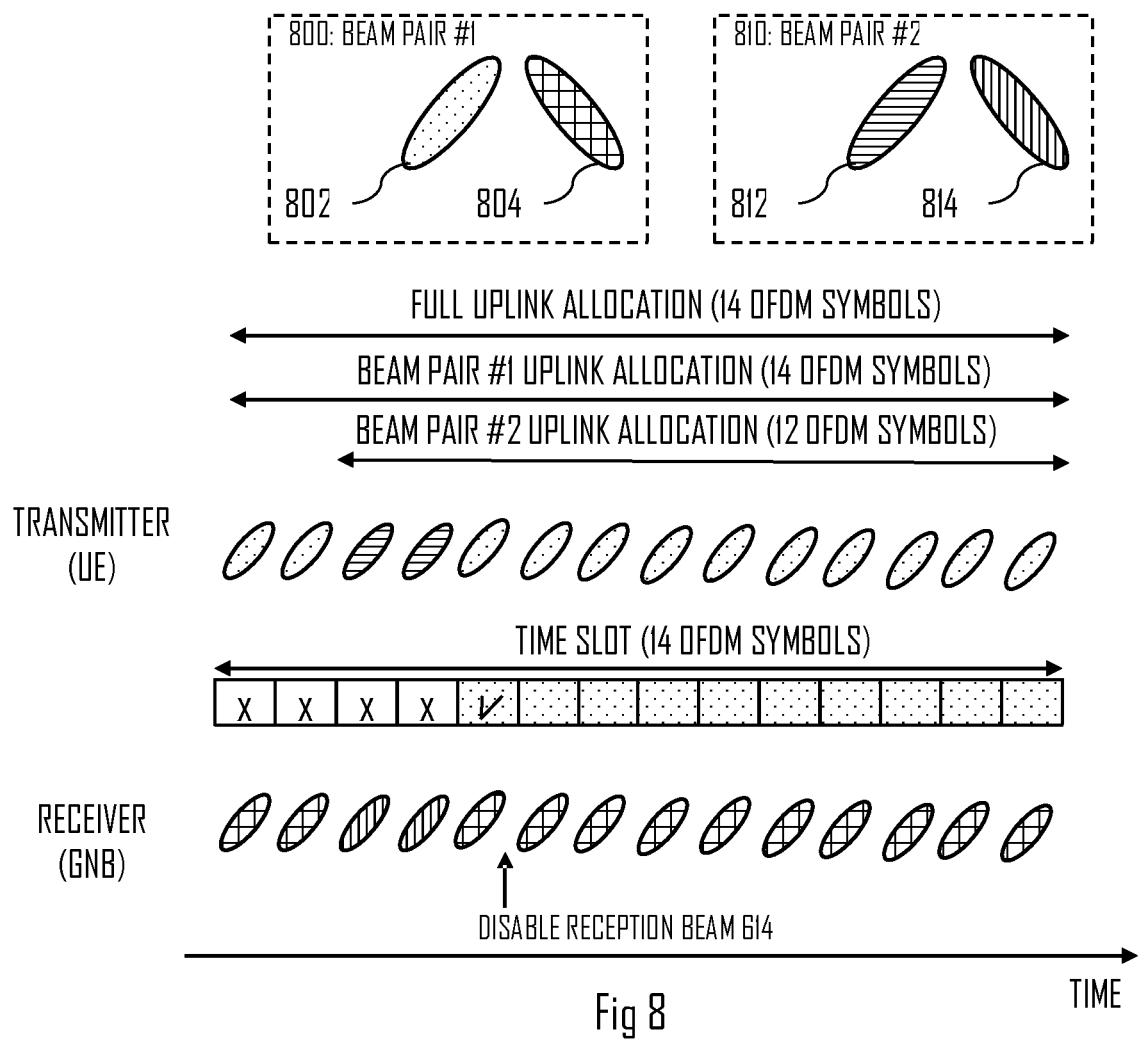

Let us now describe some embodiments for performing the transmission and reception with reference to FIGS. 6 to 8. In FIGS. 6 to 8, different embodiments for performing the channel contention for the multiple beam pairs are illustrated, as well as different embodiments for performing the transmissions during the TXOP(s). Referring to FIG. 6, let us consider an embodiment where beam pairs 600 and 610 are configured between the UE and the gNB. The embodiment of FIG. 6 is related to downlink transmission. Transmission radio beams 602, 612 are configured for the gNB while respective reception radio beams 604, 614 are configured for the UE, and the pairings are illustrated in FIG. 6. FIG. 6 further illustrates a timeline where a time slot of 14 symbols is illustrated. The radio beam icons above and below each time slot illustrate a radio beam currently active for transmission (gNB) and reception (UE) during the respective time slot.

Referring to FIG. 6, the gNB may, upon executing block 302, execute block 304 as illustrated in FIG. 6. The gNB may have a timing configuration where the gNB attempts the acquisition of the TXOP by performing the channel sensing for the transmission radio beams 602, 612 in an alternating manner. The gNB may determine time allocations of the first transmission radio beam, perform the channel sensing from the first reception radio beam during the time allocations of the first transmission radio beam, and not perform the scanning from the first transmission radio beam between the time allocations of the first transmission radio beam. In a similar manner, the gNB may determine time allocations of the second transmission radio beam within the time slot, perform the scanning from the second transmission radio beam during the time allocations of the second transmission beam, and not perform the scanning from the second transmission radio beam between the time allocations of the second transmission radio beam.

The transmission radio beam 602 may be scheduled to be the first candidate for the channel contention and the gNB may perform the channel sensing by using a beamforming configuration of the transmission radio beam 602 in the first symbol of the time slot. In this example, let us assume that the channel is sensed to be busy for the transmission radio beam 602 (illustrated by X in connection with the symbol). In the subsequent symbol, the gNB may still perform the channel sensing by using the beamforming configuration of the transmission radio beam 602 in the second symbol of the time slot. In this example, let us assume that the channel is still sensed to be busy for the transmission radio beam 602. The channel sensing for the second beam pair may be scheduled to start at the third symbol. In the third symbol, the gNB may be configured switch to the second beam pair 610 and perform the channel sensing by using the beamforming configuration of the transmission radio beam 612 in the third symbol of the time slot. In this example, let us assume that the channel is sensed to be busy for the transmission radio beam 612. In the subsequent symbol, the gNB still senses the channel from the transmission radio beam 612 and detects the channel to be busy. The channel sensing for the second beam pair may be scheduled to switch back to the beam pair 600 at the fifth symbol. Now, let us assume that the channel is detected to be free (illustrated by the tick in the fifth symbol), and the gNB acquires the TXOP by transmitting the at least one message in the fifth symbol and subsequent symbols (illustrated by the dotted pattern of the transmission radio beam 602).

The message may comprise a PDCCH control message indicating e.g. a downlink allocation on the PDSCH to the UE.

Meanwhile, the UE may employ the same timing configuration for the radio beam pairs 600, 610 as the gNB. Accordingly, the UE attempts to detect the message, e.g. the PDCCH control message addressed to the UE, from the reception radio beam 604 during the first two symbols of the time slot, from the reception radio beam 614 during the third and fourth symbol of the time slot, and again from the reception radio beam 604 during the fifth symbol. The UE may determine time allocations of the first reception radio beam, perform the scanning from the first reception radio beam during the time allocations of the first reception radio beam, and not perform the scanning from the first reception radio beam between the time allocations of the first reception radio beam. In a similar manner, the UE may determine time allocations of the second reception radio beam within the time slot, perform the scanning from the second reception radio beam during the time allocations of the second reception beam, and not perform the scanning from the second reception radio beam between the time allocations of the second reception radio beam. Upon detecting the message in the fifth (and subsequent symbols), the UE may decode the message and acquire the downlink data accordingly.

In the embodiment of FIG. 6, the gNB and the UE are configured to attempt the TXOP acquisition and detection by using both or all configured radio beam pairs but, upon acquiring the TXOP, use only one radio beam pair for the transmission. Accordingly, upon acquiring the TXOP for the radio beam pair 600, the gNB and the UE may disable the radio beam pair 610 for the duration of the TXOP, i.e. the gNB may disable the channel contention of the transmission radio beam 612 and the UE may disable detection from the reception radio beam 614.

Alternatively, the radio beam pairs may be switched during the TXOP according to a determined pattern. Upon acquiring the TXOP for the transmission radio beam 602, the gNB may still perform the channel contention for the transmission radio beam 612. Upon acquiring the TXOP also for the transmission radio beam 612, the gNB may transmit by using the transmission radio beams 602, 604 in an alternating manner to achieve diversity to the transmission. The transmission sequence of the transmission radio beams may follow a predetermined pattern of which the UE is also aware. The TXOPs of the transmission radio beams may be configured to end at the same time, regardless of the fact that they may have started at different times.

In the embodiment of FIG. 6, only one transmission radio beam and reception radio beam is in active use at a time. FIG. 7 illustrates an embodiment where multiple transmission radio beams may be active concurrently. In the embodiment of FIG. 7, the channel contention may follow the principles described above in connection with FIG. 6. Upon acquiring the TXOP for the transmission radio beam 602, the gNB may still perform the channel contention for the transmission radio beam 612 in parallel with the transmissions of the transmission radio beam 602. Upon acquiring the TXOP also for the transmission radio beam 612 (the tick in the 11$^{th}$ symbol), the gNB may perform the transmissions to both transmission radio beams 602, 612 concurrently in the subsequent symbols of the TXOP. As described above, the duration of the TXOP acquired at first may define a time limit for ending both or all TXOPs.

In a similar manner, the UE may at first attempt the detection from both reception radio beams 604, 614 and, upon detecting the message in the reception radio beam 604, the UE may still maintain the detection from the other reception radio beam(s) 614 until the TXOP ends. As in FIG. 6, the UE may follow the predetermined timing in the scanning for the message from the reception radio beams 604, 614, the timing following the timing employed by the gNB when performing the channel sensing with the respective transmission radio beams 602, 612.

In an embodiment, the CORESET and the corresponding search space set configuration with PDCCH monitoring occasions define the time allocations of the transmission radio beams for the channel sensing.

Attempting detection of the PDCCH from multiple reception radio beams may increase the complexity and power consumption of the UE. Instead of attempting to decode the PDCCH repeatedly, the UE may divide the detection into two phases. In the first phase, the UE may monitor for a waveform that is aligned with the PDCCH transmission. Such a waveform may be represented by a downlink reference signal sequence such as a primary synchronization signal (PSS), a secondary synchronization signal (SSS), or a channel state information reference signal (CSI-RS). Upon detecting the waveform, the UE may proceed to the second phase where the UE attempts to decode the PDCCH. In this manner, the UE needs not unnecessarily attempts the decoding and power consumption may be reduced.

The embodiments of FIGS. 6 and 7 are directly applicable to uplink as well.

FIG. 8 illustrates an embodiment where the UE assumes the role of the transmitter and the gNB operates as the receiver. In the uplink, the gNB may schedule an uplink resource to the UE for uplink transmission. The scheduled uplink resource is then available for the UE to carry out the channel contention and the uplink transmission according to the embodiments described herein. If the UE fails to acquire the TXOP to the scheduled uplink resource, the resource goes wasted. Therefore, configuring multiple beam pairs to attempt the TXOP acquisition improves the efficiency of the uplink resource utilization as well.

Referring to FIG. 8, let us assume that the gNB has scheduled the time slot of 14 symbols to the UE for uplink transmission. The scheduled resource may be defined in terms of the time slot, a set of frequency resource blocks, and the radio beam pairs 800, 810. As in the embodiments of FIGS. 6 and 7, each radio beam pair 800, 810 may comprises a pair of a transmission radio beam 802, 812 (UE) and a reception radio beam (gNB) 804, 814, respectively. Similar to the embodiments of FIGS. 6 and 7, the UE may configured to carry out the channel contention by using the transmission radio beam 802 and the transmission radio beam 812 such that the transmission radio beams 802, 812 have different timings for the channel contention. This effectively causes that the uplink resource allocation for the different transmission radio beams 802, 812 is different, as illustrated in FIG. 8. In the embodiment of FIG. 8, the channel contention for the transmission radio beam 802 starts from the first symbol of the time slot so the effective resource allocation for the transmission radio beam 802 equals to the full uplink resource allocation of 14 symbols. The channel contention for the transmission radio beam 812 starts after the first symbol of the time slot so the effective resource allocation for the transmission radio beam 812 is smaller than the full uplink resource allocation (partial resource allocation of 12 symbols with the timing illustrated in FIG. 8). As described above, the full allocation may end for both/all radio beam pairs at the same time, e.g. at the end of the full uplink resource allocation (end of the time slot in this example).

The actual channel contention and the uplink transmission by using the radio beams 802, 804, 812, 814 may otherwise follow the principles of the embodiment of FIG. 6 (one transmission radio beam transmitted at a time) or FIG. 7 (multiple transmission beams may be transmitted in parallel).

In an embodiment, the gNB may select the beam pairs for the uplink transmission in the scheduled uplink resource allocation by using downlink control information (DCI) on the PDCCH. The DCI may further carry the resource allocation (indication of an uplink time-frequency resource) and link adaptation parameters to be used in the transmission radio beams. The link adaptation parameters may comprise a modulation and coding scheme (MCS), and the gNB may select and indicate the link adaptation parameters separately for each configured radio beam pair. Accordingly, the transmission radio beam 802 may use different link adaptation parameters than the transmission radio beam 812. The gNB may select for one transmission radio beam such link adaptation parameters that provide a high probability of successful delivery of the data, while selecting for another transmission radio beam more aggressive link adaptation parameters that provide a higher throughput. In another embodiment, the same link adaptation parameters are applied to both/all transmission radio beams.

When applying the embodiment of FIG. 6 in the uplink, the UE may, upon acquiring the TXOP for one transmission radio beam, then ignore the scheduling grants for the other transmission radio beams at least while transmitting the one transmission radio beam. When applying the embodiment of FIG. 7, the UE may acquire the TXOPs for the multiple transmission radio beams in parallel and transmit uplink data to the multiple transmission radio beams concurrently, provided that a maximum allowed transmission power is not exceeded.

In the embodiments described in connection with FIGS. 6 to 8, the transmitter may focus the channel sensing to the directions (the radio beams) the transmitter intends to transmit. Accordingly, a separate channel sensing may be performed for the different beam pairs configured for the TXOP acquisition. In another embodiment, the transmitter may employ a widebeam LBT for the channel sensing and, upon detecting the channel to be free by using an omnidirectional sensing, carry out the transmission to the multiple transmission radio beams.

Figure 9:
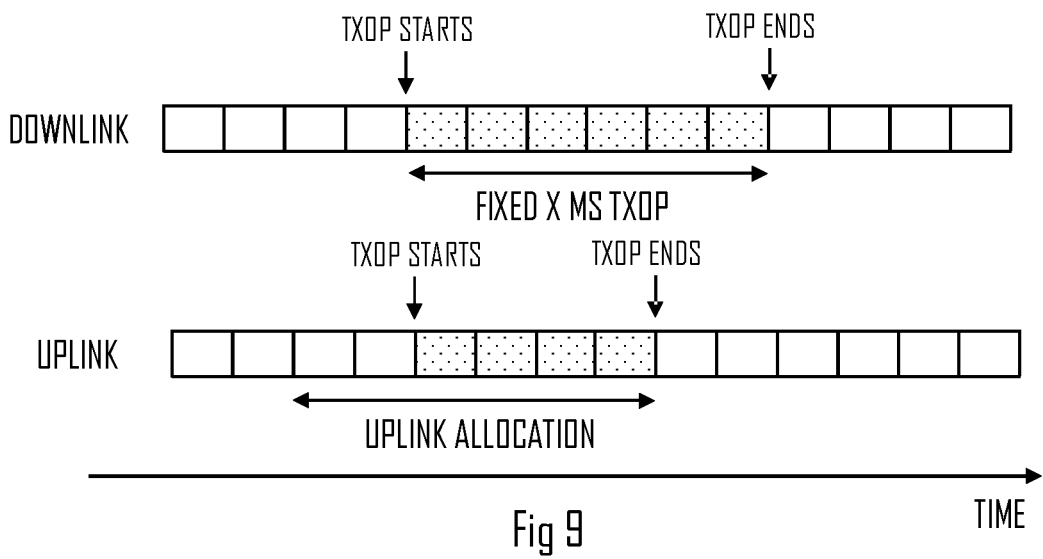
FIG. 9 illustrates transmission opportunity durations in downlink and uplink according to some embodiments.

As already described above in connection with FIG. 8, the uplink TXOP may end when the uplink resource allocation ends. Accordingly, the duration of the TXOPs may vary depending on the TXOP acquisition timing with respect to the end of the uplink resource allocation. In downlink, the TXOP may have a fixed length counted from the start of the TXOP. FIG. 9 illustrates this difference in the TXOP duration. As illustrated in FIG. 9 for the downlink, upon acquiring the TXOP, the gNB may start a counter that counts the fixed duration configured for the downlink TXOPs, e.g. 4, 6, or 8 milliseconds (ms). In response to the expiry of the counter, the gNB may end the TXOP. With respect to the uplink, the start of the TXOP may be at the start of the uplink allocation but, sometimes, the TXOP may be acquired after the uplink resource allocation has started. The uplink resource allocation, however, has a fixed end time counted from the start of the uplink resource allocation. Therefore, the duration of the TXOP may vary.

In the embodiments described above, only the transmitter acquiring the TXOP performs the transmission. In other embodiments, the TXOP owner may allow the other device of the connection to carry out transmissions within the same TXOP. For example, in the embodiment of FIG. 6 the gNB may, upon acquiring the TXOP and transmitting a message, assign the remaining TXOP to the UE for uplink transmission. The UE may then carry out the uplink transmission without the channel contention in the TXOP. In another embodiment, the UE may perform the channel contention even in the case where the gNB is readily the TXOP owner. The radio environment of the UE may be different from the radio environment of the gNB and, as a consequence, the channel sensing before the transmission may be useful in order to avoid colliding transmissions.

Figure 10:
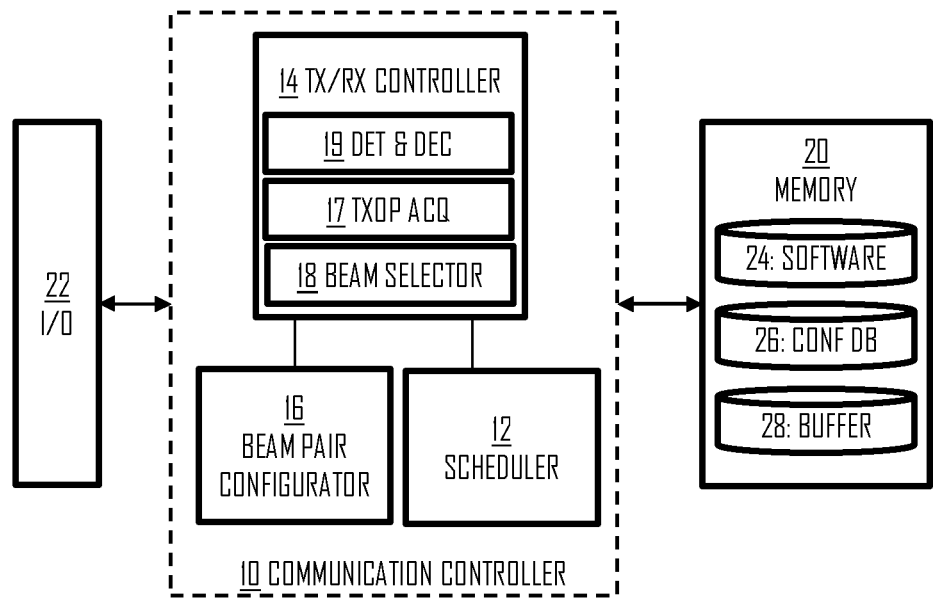
FIGS. 10 and 11 illustrate apparatuses according to some embodiments.
Figure 11:
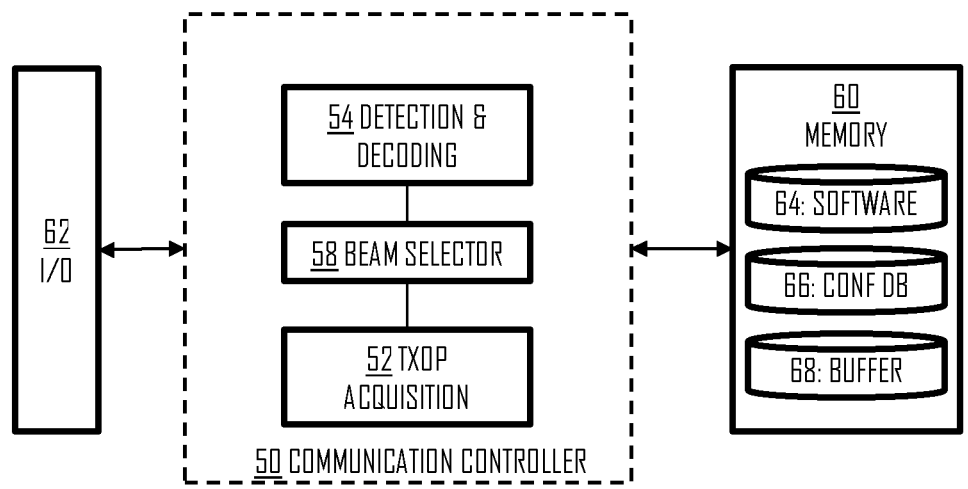

FIGS. 10 and 11 illustrate apparatuses comprising a communication controller 10, 50, such as at least one processor, and at least one memory 20, 60 including a computer program code (software) 24, 64, wherein the at least one memory and the computer program code (software) are configured, with the at least one processor, to cause the respective apparatus to carry out any one of the embodiments described above. FIG. 10 illustrates an apparatus for the access node (e.g. the gNB) or a controller controlling the operation of the access node according to the embodiments of the invention, and FIG. 11 illustrates an apparatus for the UE.

Referring to FIGS. 10 and 11, the memory 20, 60 may be implemented using any suitable data storage technology, such as semiconductor based memory devices, flash memory, magnetic memory devices and systems, optical memory devices and systems, fixed memory and removable memory. The memory may comprise a configuration database 26, 66 for storing configuration parameters, e.g. the beam pairs described above. The memory 20, 60 may further store a data buffer 28, 68 for data waiting for transmission. The data in the buffer may at least indirectly trigger the channel contention in the apparatus.

Referring to FIG. 10, the apparatus may further comprise a communication interface 22 comprising hardware and/or software for realizing communication connectivity according to one or more communication protocols. The communication interface 22 may provide the apparatus with communication capabilities to the UEs served by the access node. In an embodiment, the communication interface may comprise one or more antenna arrays providing the apparatus with capability of forming directive the transmission radio beams and the reception radio beams described above. The communication interface may comprise standard well-known components such as an amplifier, filter, frequency-converter, (de)modulator, and encoder/decoder circuitries and one or more antennas. The communication interface 22 may be configured to control operation of the one or more antenna arrays for providing radio beams. Further, other transmission related parameters, such as power, polarization and/or scheduling may be controlled at least partly by the communication interface.

The communication controller 10 may comprise a beam pair configurator 16 configured to carry out blocks 500 and 502 and determine the radio beam pairs for the communication connection. The communication controller 10 may further comprise a scheduler 12 configured to schedule uplink and downlink transmissions of the communication connection The elements 12, 16 may configure the operation of a transmission/reception (TX/RX) controller 14 that carries out the embodiment of FIG. 3 in the transmission and the embodiment of FIG. 4 in the reception. The TX/RX controller 14 may comprise a detection and decoding circuitry 19 configured to carry out the embodiment of FIG. 4 by using the reception radio beams received from the beam pair configurator. The TX/RX controller 14 may comprise TXOP acquisition circuitry 17 configured to carry out the channel sensing according to the embodiment of FIG. 3 when the apparatus is transmitting data. A beam selector circuitry 18 may select the transmission radio beams and the reception radio beams for the transmission and receptions, respectively, as indicated by the beam pair configurator 16.

In an embodiment, at least some of the functionalities of the apparatus may be shared between two physically separate devices, forming one operational entity. Therefore, the apparatus may be seen to depict the operational entity comprising one or more physically separate devices for executing at least some of the described processes. Thus, the apparatus utilizing such shared architecture, may comprise a remote control unit (RCU), such as a host computer or a server computer, operatively coupled (e.g. via a wireless or wired network) to a remote radio head (RRH), such as a Transmission Reception Point (TRP), located in a base station or network node 104. Some examples of the RRH/TRP configurations are illustrated in FIGS. 2A and 2B. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Referring to FIG. 11, the apparatus for the UE comprises a communication interface 62 comprising hardware and/or software for realizing communication connectivity according to one or more radio communication protocols. The communication interface 62 may provide the apparatus with communication capabilities to the access node of the communication connection. In an embodiment, the communication interface may comprise one or more antenna arrays providing the apparatus with capability of forming directive the transmission radio beams and the reception radio beams described above. The communication interface may comprise standard well-known components such as an amplifier, filter, frequency-converter, (de)modulator, and encoder/decoder circuitries and one or more antennas. The communication interface 62 may be configured to control operation of the one or more antenna arrays for providing the radio beams.

The communication controller 50 may be configured to carry out the embodiment of FIG. 3 in the transmission and the embodiment of FIG. 4 in the reception. The communication controller 50 may comprise a detection and decoding circuitry 54 configured to carry out the embodiment of FIG. 4 by using the reception radio beams received from the serving access node in step 504, for example. The communication controller 50 may comprise a TXOP acquisition circuitry 52 configured to carry out the channel sensing according to the embodiment of FIG. 3 when the apparatus is transmitting data. A beam selector circuitry 18 may select the transmission radio beams and the reception radio beams for the transmission and reception, respectively, as defined in the radio beam pair configuration.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 9 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor, and
   at least one non-transitory memory including computer program code,
   the at least one memory and computer program code configured to, with the at least one processor, cause the apparatus to perform:
   configuring a first radio beam pair and at least a second radio beam pair to a communication connection, wherein the first radio beam pair comprises a first transmission radio beam having a first transmission direction and the second radio beam pair comprises a second transmission radio beam having a second transmission direction different from the first transmission direction;
   enabling simultaneous transmission of the first transmission radio beam and the second transmission radio beam;
   triggering channel contention to transmit at least one message and for performing radio channel sensing for both the first transmission radio beam and the second transmission radio beam during the channel contention;
   acquiring a transmission opportunity for the first radio transmission beam in response to the radio channel sensing detecting that a radio channel is available for the first transmission radio beam; and
   upon acquiring the transmission opportunity for the first transmission radio beam, continuing the channel contention for the second transmission radio beam while performing transmission of the at least one message with the first transmission radio beam;
   upon acquiring a transmission opportunity for the second transmission radio beam, transmitting the at least one message with the first transmission radio beam and the second transmission radio beam.

2. The apparatus of claim 1, wherein the at least one memory and the computer program code are further configured to, with the at least one processor, cause the apparatus to perform the channel sensing simultaneously for the first transmission radio beam and the second transmission radio beam.

3. The apparatus of claim 1, wherein the at least one memory and the computer program code are further configured to, with the at least one processor, cause the apparatus to perform the channel sensing by switching between the first transmission radio beam and the second transmission radio beam.

4. The apparatus of claim 3, wherein the at least one memory and the computer program code are further configured to, with the at least one processor, cause the apparatus to perform the switching between the first transmission radio beam and the second transmission radio beam according to a timing pattern determined before the channel contention is triggered.

5. The apparatus of claim 1, wherein the at least one memory and the computer program code are further configured to, with the at least one processor, cause the apparatus to end the transmission opportunity of both the first transmission radio beam and the second transmission radio beam when a time limit for ending the transmission opportunity of the first transmission radio beam is reached.

6. The apparatus of claim 1, wherein the transmission opportunity for the first transmission radio beam starts when the apparatus starts the transmission of the at least one message with the first transmission radio beam and ends at a determined time instant.

7. The apparatus of claim 6, wherein the apparatus is for a terminal device of a cellular communication system, wherein the first transmission radio beam and the second transmission radio beam are uplink transmission radio beams, and wherein the at least one memory and the computer program code are further configured to, with the at least one processor, cause the apparatus to receive the determined time instant from an access node before the transmission opportunity starts.

8. The apparatus of claim 6, wherein the apparatus is further configured to receive a configuration of the beam pairs from the access node before the transmission opportunity for the first transmission radio beam starts.

9. The apparatus of claim 1, wherein the apparatus is for an access node of a cellular communication system, wherein the first transmission radio beam and the second transmission radio beam are downlink transmission radio beams, and wherein the at least one memory and the computer program code are further configured to, with the at least one processor, cause the apparatus to determine the time instant from a start time of the transmission opportunity.

10. A method comprising:
configuring, with an apparatus, a first radio beam pair and at least a second radio beam pair to a communication connection, wherein the first radio beam pair comprises a first transmission radio beam having a first transmission direction and the second radio beam pair comprises a second transmission radio beam having a second transmission direction different from the first transmission direction;
enabling, with the apparatus, simultaneous transmission of the first transmission radio beam and the second transmission radio beam;
triggering, with the apparatus, channel contention to transmit at least one message from the apparatus and performing radio channel sensing for both the first transmission radio beam and the second transmission radio beam during the channel contention;
acquiring, with the apparatus, a transmission opportunity for the first transmission beam in response to detecting that a radio channel is available for the first transmission radio beam;
upon acquiring the transmission opportunity for the first transmission radio beam, continuing the channel contention for the second transmission radio beam while performing transmission of the at least one message with the first transmission radio beam; and
upon acquiring a transmission opportunity for the second transmission radio beam, transmitting the at least one message with the first transmission radio beam and the second transmission radio beam.

11. The method of claim 10, wherein the channel sensing is performed simultaneously for the first transmission radio beam and the second transmission radio beam.

12. The method of claim 10, wherein the channel sensing is performed by switching between the first transmission radio beam and the second transmission radio beam.

13. The method of claim 12, wherein the switching between the first transmission radio beam and the second transmission radio beam is performed according to a timing pattern determined before the channel contention is triggered.

14. The method of claim 10, further comprising ending the transmission opportunity of both the first transmission radio beam and the second transmission radio beam when a time limit for ending the transmission opportunity of the first transmission radio beam is reached.

15. The method of claim 10, wherein the transmission opportunity for the first transmission radio beam starts when the apparatus starts the transmission of the at least one message with the first transmission radio beam and ends at a determined time instant.

16. The method of claim 15, the method is performed in a terminal device of a cellular communication system, wherein the first transmission radio beam and the second transmission radio beam are uplink transmission radio beams, and the method further comprises receiving the determined time instant from an access node before the transmission opportunity starts.

17. The method of claim 15, further comprising receiving a configuration of the radio beam pairs from the access node before the transmission opportunity for the first transmission radio beam starts.

18. The method of claim 10, wherein the method is performed in an access node of a cellular communication system, wherein the first transmission radio beam and the second transmission radio beam are downlink transmission radio beams, and the method further comprises determining the time instant from a start time of the transmission opportunity.

* * * * *